United States Patent Office 3,441,380
Patented Apr. 29, 1969

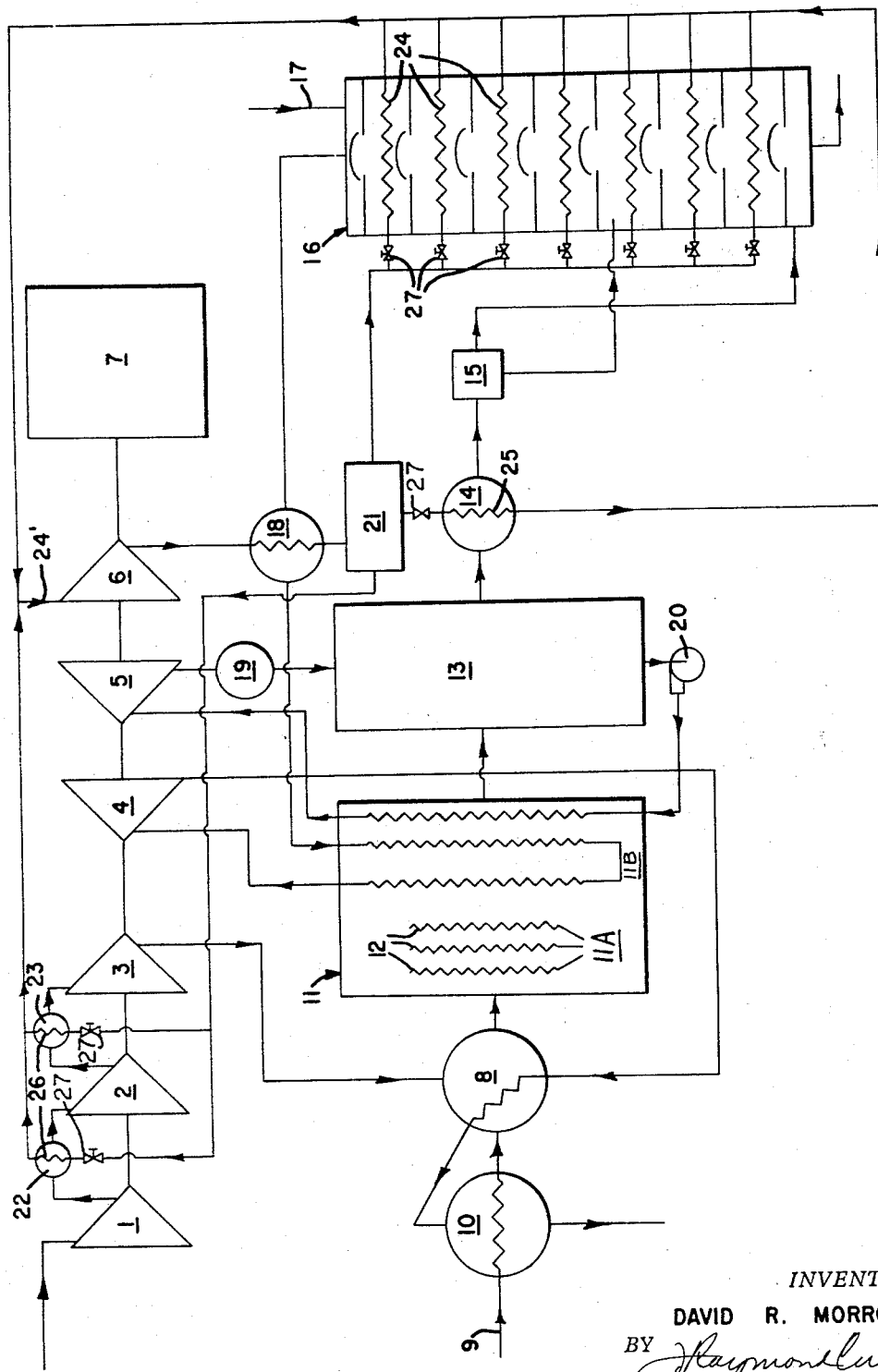

3,441,380
ACID PRODUCING PLANT
David R. Morrow, Irwin, Pa., assignor to Carrier Corporation, Syracuse, N.Y., a corporation of Delaware
Filed Oct. 22, 1965, Ser. No. 500,912
Int. Cl. B01j 1/14, 9/04; C01b 21/40
U.S. Cl. 23—260                           7 Claims

ABSTRACT OF THE DISCLOSURE

A nitric acid producing plant employing a refrigeration unit which utilizes energy given off by the chemical reactions productive of nitric acid to cool the substances produced by the chemical reactions and to reduce the temperature of the plant absorption tower to increase reaction efficiency and decrease reaction time to increase plant efficiency.

---

This invention relates to the manufacture of acid and more particularly to an improved method and apparatus for producing a gaseous oxide that can be absorbed in water to produce an acid.

In the manufacture of an acid such as nitric acid, ammonia is oxidized in the presence of a platinum catalyst to produce nitric oxide. The oxide is then absorbed in water to produce nitric acid. For maximum efficiency, the ammonia is vaporized and then mixed with high pressure air before oxidation. To supply this high pressure air, the heat of oxidation is utilized to heat motive fluid to power steam and/or gas turbines which drive air compressors.

In present plants, the energy obtained from the oxidation process is barely sufficient to drive the air compressors. Also in present plants, a large expensive absorption tower is necessary to produce acid by absorbing the oxide in water.

It is therefore an object of this invention to provide an improved plant for the production of acid which will efficiently utilize the energy given off by the process to completely power the plant.

It is a further object of this invention to provide a plant for the production of acid which will produce enough excess energy to drive a generator or other device for producing power or useful work.

It is a further object of this invention to provide a plant which is smaller, more compact, and which produces a greater amount of stronger acid than existing plants.

It is also an object of this invention to provide a plant with a smaller, more economical absorption tower for converting the gaseous oxide into an acid. Because of the presence of acid in the absorption tower, it must be constructed of expensive, acid resistant metals. Any decrease in the size of the tower obviously results in a savings due to decreased use of expensive metals.

It is another object of this invention to provide a refrigeration unit operable in conjunction with the nitric acid producing plant to cool the various substances used and the absorption tower to increase reaction efficiency, decrease reaction time and generally increase the efficiency of the whole plant by utilizing the energy represented by the heat absorbed in accomplishing the cooling action.

It is a further object of this invention to provide an improved method for the production of acid from a gaseous oxide which is absorbable in water to produce an acid.

The objects of this invention are obtained by providing air compression means, a refrigerant compressor and an electrical generator all driven by a steam turbine and a gas turbine.

The chemical to be oxidized to produce the acid is first vaporized and mixed with high pressure air from the compressors. The mixture is then oxidized in a chamber in the presence of a catalyst. The oxide produced is directed through an economizer, a cooler, a weak acid separator and into an absorption tower where it reacts with water to produce acid and tailgas, a waste product. The tailgas is routed from the absorption tower, through the oxidizing combustion chamber, where it is heated, and then to a gas turbine to provide motive power to drive the turbine. A steam turbine is also utilized to power this system. Water is pumped through the oxidizing combustion chamber where it is converted to steam to drive the steam turbine. It is thereafter condensed and sent through the economizer back to the water pump.

In order to achieve additional operating economy, it is proposed to improve the cycle described to include a refrigeration circuit for the purpose of absorbing the heat produced in the absorption tower and delivering it to parts of the cycle requiring heat.

To this end, a compressor, driven by the steam and hot gas turbines, is used to compress a refrigerant. The compressed refrigerant is then cooled by the tailgas obtained from the absorption tower, effectively preheating the tailgas before it is heated in the combustion chamber. The refrigerant is used to cool the oxide after it emerges from the economizer. The refrigerant is also used to cool the absorption tower to provide a more efficient absorption and a higher strength acid with a smaller, more economical tower. Finally, refrigerant is used to cool the compressed air between compression stages to reduce the amount of power necessary to drive the compression means.

The preferred embodiment of this invention is illustrated in the accompanying drawing which is a diagrammatic view of a nitric acid producing plant.

Referring to the drawings there is shown a low pressure compressor 1, an intermediate pressure compressor 2 and a high pressure compressor 3 driven by a gas turbine 4 and a steam turbine 5. Turbines 4 and 5 also drive refrigerant compressor 6 and electrical generator 7. High pressure air from the compressor 3 is routed to an ammonia and air mixer and preheater 8. Ammonia is supplied from supply line 9, through vaporizer 10 to the mixer-preheater 8. Heated, mixed air and ammonia vapor from the mixer 8 is supplied to a converter section 11A of chamber 11 having therein platinum catalysts 12. The mixture burns in the presence of a catalyst, producing NO and $NO_2$ which is delivered to an economizer 13, through a cooler 14 to a weak acid separator 15. From there, the gaseous oxide is routed to an absorption tower 16 and the weak acid from the separator 15 is delivered to the bottom portion of absorption tower 16 for subsequent passage through the acid output line of the absorption tower. Water, entering the absorption tower through line 17 combines with the oxide to produce $HNO_3$ which is drained out the bottom of the tower while a waste gas, $N_2$, is drawn out the top of the tower. The cold tailgas ($N_2$) is conducted through a refrigerant condenser-tailgas preheater 18 and then through boiler section 11B of chamber 11 where it picks up sufficient heat to drive gas turbine 4. From the turbine, the tailgas is routed to the mixer-preheater 8 to heat up the air-ammonia mixture. From the mixer 8, the tailgas is routed to the vaporizer 10 to provide heat to vaporize the liquid ammonia. From the vaporizer 10, the tailgas is exhausted to the atmosphere.

Water, pumped into the boiler section of chamber 11 and converted into steam by the heat therein, is supplied to the steam turbine 5, condensed in condenser 19, used as a coolant in economizer 13 and delivered back to the pump 20.

The refrigeration system employed to increase the efficiency of the plant is comprised of compressor 6, condenser 18, liquid refrigerant storage tank 21, cooler 14, compressed air coolers 22 and 23, absorption tower coils 24, and suction conduit 24'.

Vaporized refrigerant is supplied to compressor 6 and compressed, being converted to the liquid phase in condenser 18. The compressed liquid refrigerant cooled in the refrigerant cooler-tailgas preheater 18 is routed to refrigerant liquid storage tank 21. The liquid is then directed to cooler evaporator coils 25, absorption tower evaporator coils 24 and cooler evaporator coils 26 in parallel, passing through expansion nozzles 27 en route. The refrigerant is vaporized as it absorbs heat in the absorption tower 16, the cooler condenser 14 and coolers 22 and 23. The heat in the absorption tower includes heat generated by the chemical process occurring therein as well as heat transferred as the vapor is cooled and converted to a liquid.

The coolers 22 and 23, by cooling the air between compression stages, reduce the amount of energy necessary to compress the air. By cooling the nitric oxide in cooler 14 and maintaining the absorption tower 16 at a low temperature, the efficiency of the tower is increased, allowing the use of a smaller, less expensive tower to produce an acid of high concentration.

By refrigerating the system, efficiency of the plant is increased to a point where there is sufficient excess energy given off by the process and recovered through utilization of the latent heat of vaporization and the latent heat of condensation of the refrigerant to drive a generator or other machine to provide power for other operations in the factory.

While I have described a preferred embodiment of my invention, it will be understood that the invention is not limited thereto but may be otherwise embodied within the scope of the following claims.

I claim:

1. A plant for producing acid by absorbing in water a gaseous oxide of a substance productive of said acid, said plant comprising air compression means to provide high pressure air for the oxidation of said substance,
    a chamber in communication with said high pressure air and said substance for oxidizing said substance,
    an absorption tower having water flowing therethrough for receiving said oxide and absorbing said oxide in water for producing acid and a waste product-tailgas,
    a volatile refrigerant compressor,
    a condenser for condensing the compressed volatile refrigerant,
    a liquid storage tank to hold said condensed refrigerant,
    a refrigerant evaporator in heat transfer relation with said absorption tower, and
    means for forwarding liquid refrigerant to said evaporator from said liquid storage tank for evaporation in said evaporator to maintain said absorption tower at a low temperature and absorbing heat developed in the tower.

2. A plant for producing acid according to claim 1 including a cooler disposed between said chamber and said absorption tower and means for forwarding a portion of the liquid refrigerant to said cooler in heat transfer relation with said oxide to precool said oxide prior to flow to the absorber.

3. A plant for producing acid according to claim 1 including coolers disposed between the stages of said air compression means and means for forwarding a portion of the liquid refrigerant to said coolers in heat transfer relation with the air between compression stages to cool the air between stages.

4. A plant for producing acid according to claim 1 including means for forwarding said tailgas to said condenser in heat transfer relation with said refrigerant to cool said refrigerant and preheat said tailgas.

5. A plant for producing acid by absorbing in water a gaseous oxide of a substance productive of said acid, said plant comprising turbine driven air compression means to provide high pressure air for the oxidation of said substance,
    a vaporizer for vaporizing said substance,
    a mixer-preheater in communication with said air compression means and said vaporizer to mix said air and said vaporized substance, means for passing the exhaust of said turbine in heat exchange relation with the air and vaporized substance to preheat said mixture,
    a chamber in communication with said mixer-preheater for oxidizing said mixture,
    an absorption tower having water flowing therethrough for receiving the oxide produced in said chamber and absorbing said oxide in water to produce acid and a waste product, tailgas.

6. A plant for producing acid according to claim 5 including a gas turbine for driving said air compression means,
    means for forwarding said tailgas through said chamber in heat transfer relation to absorb a portion of the heat of oxidation,
    means for forwarding the hot tailgas from said chamber through said gas turbine to drive said turbine,
    means for forwarding the tailgas discharged from said turbine through said mixer-preheater and through said vaporizer in heat transfer relation to transfer heat from said tailgas to said substance to vaporize said substance and to transfer heat from said tailgas to said mixture to preheat said mixture.

7. A plant for producing acid by absorbing in water a gaseous oxide of a substance productive of said acid, said plant comprising air compression means to provide high pressure air for the oxidation of said substance,
    a gas turbine for driving said air compression means,
    a vaporizer for vaporizing said substance,
    a mixer-preheater in communication with said air compression means and said vaporizer to mix said air and said vaporized substance and to preheat said mixture,
    a chamber in communication with said mixer-preheater for oxidizing said mixture,
    an absorption tower having water flowing therethrough for receiving the oxide produced in said chamber and absorbing said oxide in water to produce acid and a waste product, tailgas,
    a volatile refrigerant compressor, operably connected to said turbine to absorb a portion of the excess mechanical energy developed by said turbine,
    a condenser for condensing the compressed volatile refrigerant,
    a liquid storage tank to hold said condensed refrigerant,
    a refrigerant evaporator in heat transfer relation with said absorption tower,
    means for forwarding a portion of the liquid refrigerant to said evaporator for maintaining said absorption tower at a low temperature and absorbing the heat of absorption,
    a cooler disposed between said chamber and said absorption tower,
    means for forwarding a portion of the liquid refrigerant to said cooler in heat transfer relation with said oxide to precool said oxide prior to flow to the absorber,
    coolers disposed between the stages of said air compression means,
    means for forwarding a portion of the liquid refrigerant to said coolers in heat transfer relation with the air between compression stages to cool the air between stages,
    means for forwarding said tailgas to said condenser in heat transfer relation with said refrigerant to cool said refrigerant and preheat said tailgas,
    means for forwarding said tailgas from said condenser through said chamber in heat transfer relation to absorb a portion of the heat of oxidation, means for forwarding the hot tailgas from said chamber through said gas turbine to drive said turbine, and means for forwarding the tailgas discharged from said turbine through said mixer-preheater and through said vaporizer in heat transfer relation to transfer heat from said tailgas to said substance to vaporize said substance and to transfer heat from said tailgas to said mixture to preheat said mixture.

References Cited

UNITED STATES PATENTS

| 2,942,953 | 6/1960 | Shields | 23—260 |
| 3,136,602 | 6/1964 | Berger | 23—162 |

JAMES H. TAYMAN, Jr., *Primary Examiner.*

U.S. Cl. X.R.

23—162, 157; 60—50